United States Patent [19]

Liu

[11] Patent Number: 5,083,882
[45] Date of Patent: Jan. 28, 1992

[54] TUBE CONNECTOR

[76] Inventor: Chu Liu, 3-2F, No. 151, Hsueh-Shih Rd., Taichung, Taiwan

[21] Appl. No.: 734,920

[22] Filed: Jul. 24, 1991

[51] Int. Cl.$^5$ ............................................. F16B 7/00
[52] U.S. Cl. .................................... 403/297; 403/295
[58] Field of Search ................................. 403/297, 295

[56] References Cited

U.S. PATENT DOCUMENTS

| | | | |
|---|---|---|---|
| 4,090,798 | 5/1978 | Barton | 403/297 X |
| 4,249,830 | 2/1981 | Day | 403/297 X |
| 4,859,109 | 8/1989 | Targetti | 403/297 |

FOREIGN PATENT DOCUMENTS

737562  9/1955  United Kingdom ................ 403/297

*Primary Examiner*—Andrew V. Kundrat
*Attorney, Agent, or Firm*—Johnson & Gibbs

[57] ABSTRACT

A tube connector includes a pair of matching press members, each having an enlarged exposed portion and at least two angularly spaced insert portions extending from the exposed portion. The insert portions of one press member form cylindrical members with the insert portions of the other press member. Each cylindrical member formed is inserted into one end of a respective tube such that a distal end of the respective tube abuts against the exposed portion of the press members. The exposed portion of each press member is provided with a counterbore having a truncated conical portion and a cylindrical portion. The head portion of a bolt and a nut, which engages the threaded shaft portion of the bolt, are each received in the truncated conical portion of the counterbore in a respective one of the press members. The bolt is rotated so as to move the nut axially along the threaded shaft portion between a first position, wherein the flat first sides of the press members abut against one another, and a second position, wherein the flat first sides are spaced apart and the press members tightly press against an inner surface of the respective tube.

5 Claims, 12 Drawing Sheets

TUBE CONNECTOR

BACKGROUND OF THE INVENTION

1. Field of the Invention

This invention relates to a connecting device, more particularly to a tube connector for joining together two or more tubes at different angles without the need for conducting a welding operation.

2. Description of the Related Art

Currently, metal and plastic tubes have gradually replaced bamboo and wooden posts in building temporary structures, such as billboard frames, camper tent frames, sun shade posts and even roof frames. In engineering mechanics, a plurality of metal tubes are occasionally used to build trusses. The metal tubes are sometimes connected in axial alignment to obtain a longer length and are often joined so as to form a desired angle therebetween.

Present tube connecting techniques make use of a welding operation or a pre-welded structure so as to join two tubes at their ends. These techniques are troublesome, time consuming, and may require initial material preparation. Furthermore, appropriate corrections cannot be easily undertaken when using these techniques.

SUMMARY OF THE INVENTION

The main objective of the present invention is to provide a tube connector to securely join together two or more tubes at different angles without the need for conducting a welding operation.

Accordingly, the preferred embodiment of a tube connector of the present invention comprises a pair of matching press members and at least one expansible engaging means. Each of the press members has a flat first side, a second side opposite the flat first side, an enlarged exposed portion and at least two angularly spaced insert portions extending from the exposed portion. The insert portions of one press member form cylindrical members with the insert portions of the other press member. Each cylindrical member formed is inserted into one end of a respective tube such that a distal end of the respective tube abuts against the exposed portion of the press members. The exposed portion of each press member has a flat side surface at the flat first side in which a counterbore is formed. The counterbore has a truncated conical portion and a cylindrical portion. The expansible engaging means includes a bolt with a head portion and a threaded shaft portion, and a nut to engage the threaded shaft portion. Each head portion and nut are received in the truncated conical portion of the counterbore by one of the respective press members. The outer diameters of the head portion and the nut should be smaller than the greatest diameter of the truncated conical portion of the counterbore and should be greater than the smallest diameter of the truncated conical portion of the counterbore. The bolt is rotated so as to move the nut axially along the threaded shaft portion between a first position, wherein the flat first sides of the press members abut against one another, and a second position, wherein the flat first sides are spaced apart and the press members tightly press against an inner surface of the respective tube. The insert portions are shaped as elongated cylindrical halves while the exposed portion of each of the press members may be shaped as an elongated cylindrical half or as an annular member, as will be shown in the detailed discussion of the different aspects of the present invention.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
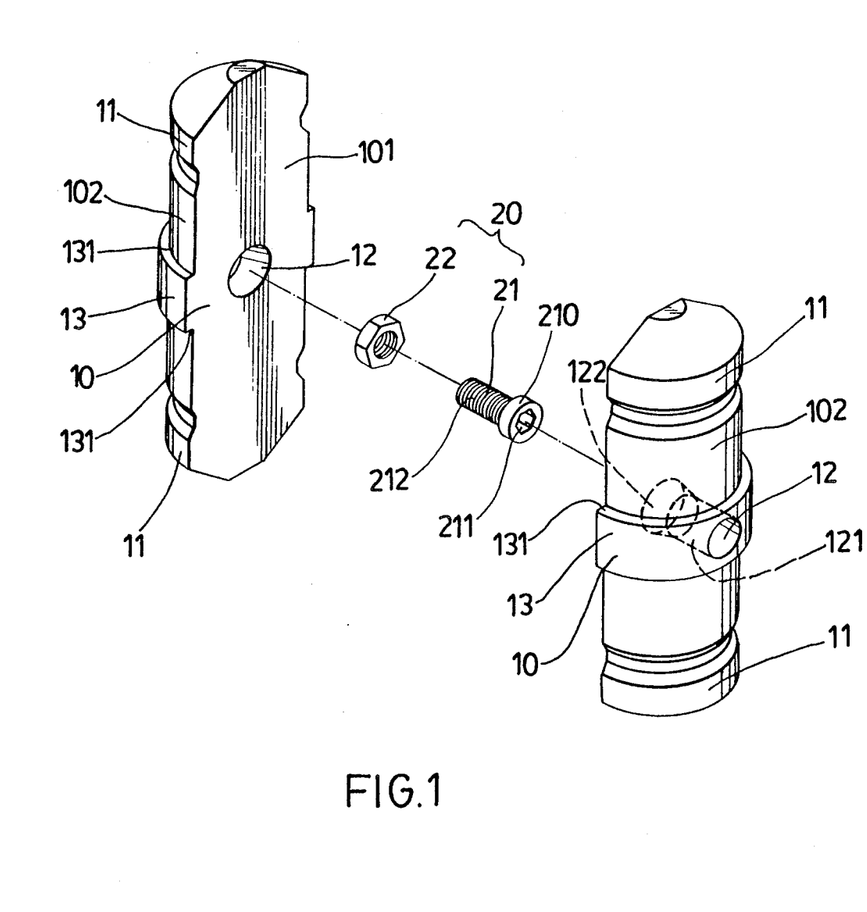
FIG. 1 is an exploded view of the first preferred embodiment of a tube connector according to the present invention.

Referring to FIG. 1, the first preferred embodiment of a tube connector according to the present invention is shown to comprise a pair of matching press members 10 and an expansible engaging means 20. Each of the press members 10 has a flat first side 101, a curved second side 102 opposite to the flat first side 101, an enlarged exposed portion 13, and two insert portions 11 attached to two ends of the exposed portion 13. The insert portions 11 and the exposed portion 13 are shaped as elongated cylindrical halves. A shoulder 131 is formed between the exposed portion 13 and each of the insert portions 11 at the curved second side 102. The exposed portion 13 of each press member 10 has a flat side surface at the flat first side 101, provided with a counterbore 12 that includes a cylindrical portion 121 and a truncated conical portion 122. The expansible engaging means 20 includes a threaded bolt 21 having a head portion 210 provided with a hexagonal groove 211 and a threaded shaft portion 212, and a nut 22 to engage the threaded shaft portion 212. The outer diameters of the threaded bolt 21 and the nut 22 should be smaller than the greatest diameter of the truncated conical portion 122 and should be greater than the smallest diameter of the truncated conical portion 122. This permits positioning of the expansible engaging means 20 inside the counterbores 12 of the matching press members 10.

Figure 2:
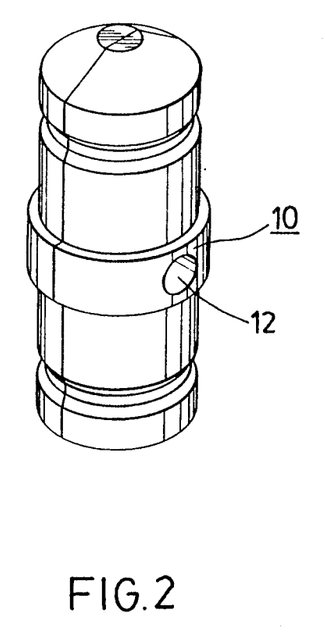
FIG. 2 is a perspective view of the assembled first preferred embodiment.
Figure 3A:
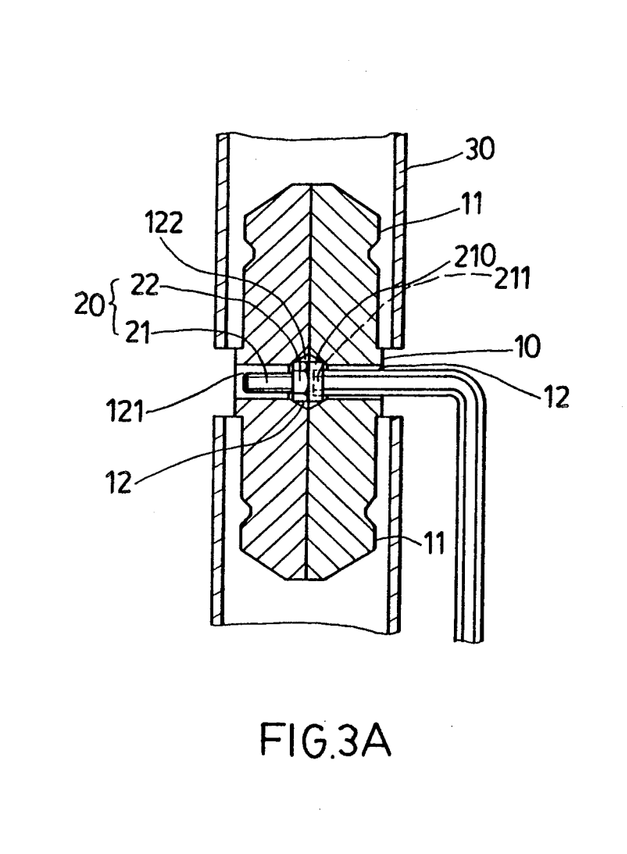
FIG. 3A is a sectional view of the first preferred embodiment when in a fully contracted position.
Figure 3B:
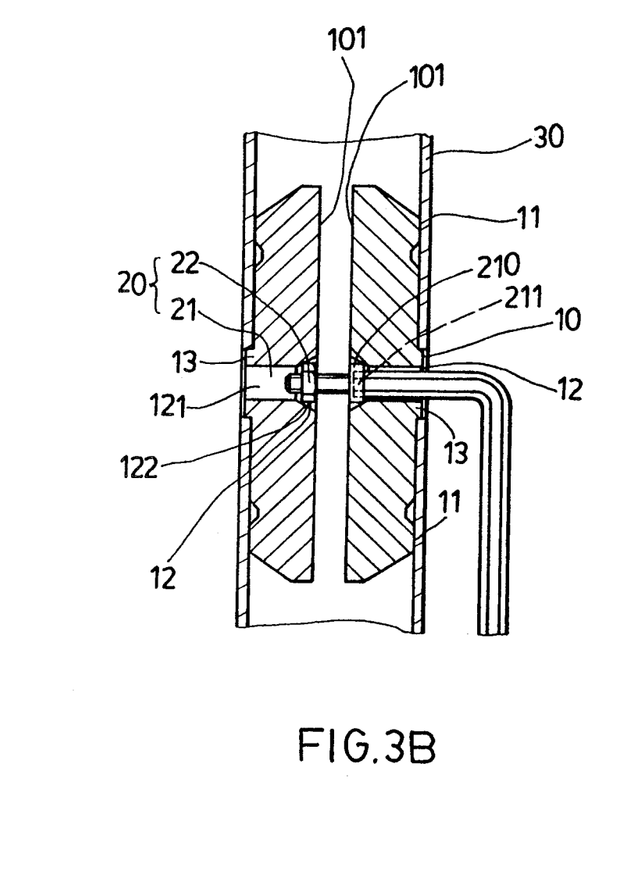
FIG. 3B is a sectional view of the first preferred embodiment when in a fully expanded position of use.

The first preferred embodiment is used to tightly join two tubes in an axially aligned manner so as to obtain a tube of longer length. FIGS. 2 and 3A illustrate the first preferred embodiment when in a fully contracted position. The flat first sides 101 of the matching press members 10 abut against one another. The head portion 210 of the threaded bolt 21 and the nut 22 are in tight contact and are each received in the truncated conical portions 122 of the counterbores 12 by the respective matching press members 10. The insert portions 11 of the matching press members 10 form two cylindrical members, each being inserted into one end of a respective tube 30. A wrench is used to rotate the threaded bolt 21 so as to move the nut 22 axially along the threaded shaft portion 212, thereby expanding the matching press members 10, as shown in FIG. 3B. The threaded bolt 10 is rotated until the matching press members 10 are tightly pressed against the inner surfaces of the tubes 30. The distal end of each tube 30 abuts against one of the shoulders 131 of the matching press members 10. The exposed portion 13 of the matching press members 10 thus bridges the gap between the tubes 30.

Figure 4A:
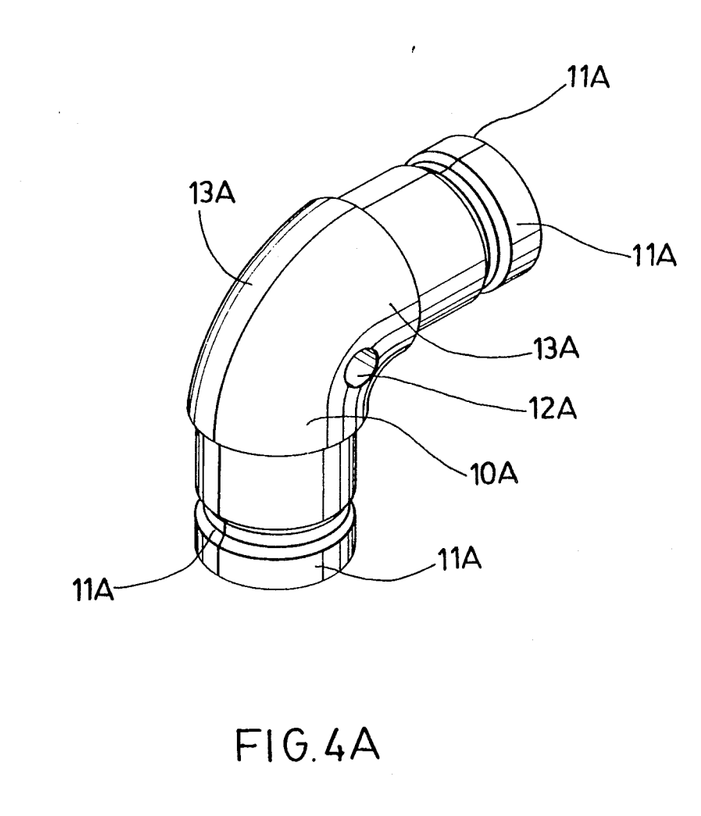
FIG. 4A is a perspective view of the second preferred embodiment of a tube connector according to the present invention.

Referring to FIG. 4A, the second preferred embodiment of a tube connector according to the present invention comprises a pair of matching press members (10A) and an expansible engaging means (not shown). Each of the press members (10A) has an exposed portion (13A), and two insert portions (11A) attached to two ends of the exposed portion (13A). The exposed portion (13A) is provided with a counterbore (12A) and is curved so as to form a 90 degree angle between the insert portions (1IA).

Figure 4B:
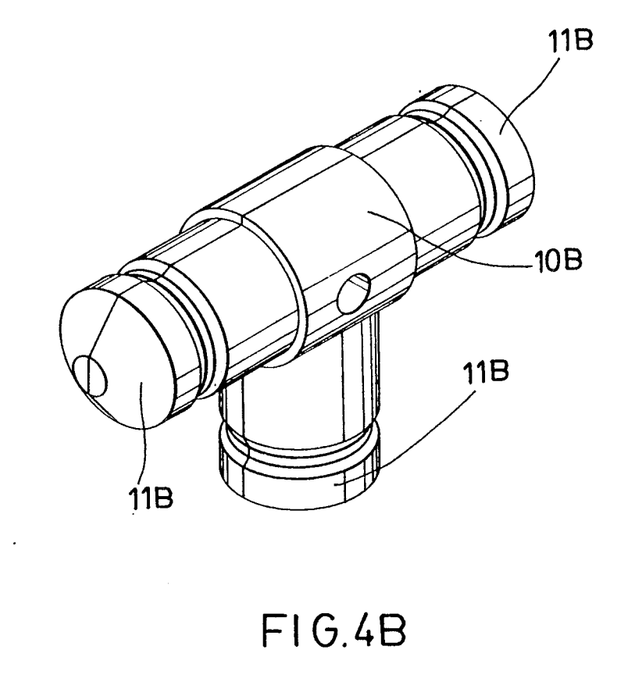
FIG. 4B is a perspective view of the third preferred embodiment of a tube connector according to the present invention.

Referring to FIG. 4B, the third preferred embodiment of a tube connector according to the present invention is shown to comprise a pair of substantially T-shaped matching press members (10B). Each of the matching press members (10B) has three insert portions (11B) to join three tubes or to join two tubes in an axial or perpendicular direction.

Figure 4C:
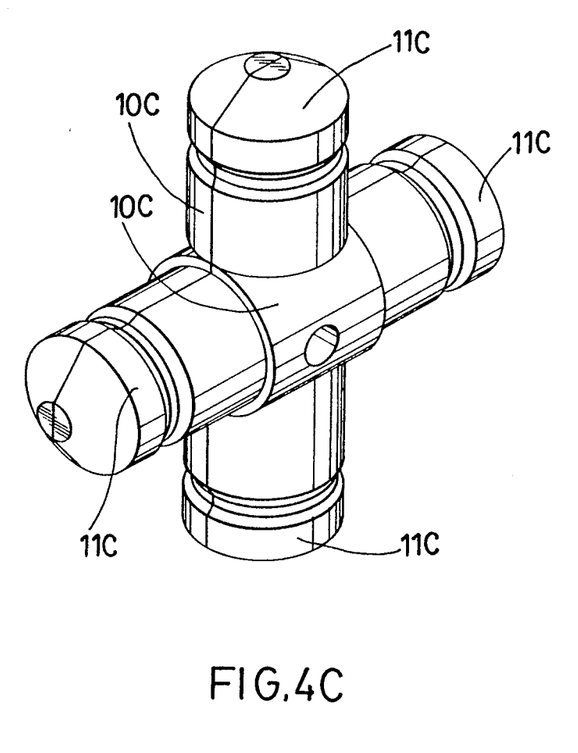
FIG. 4C is a perspective view of the fourth preferred embodiment of a tube connector according to the present invention.

Referring to FIG. 4C, the matching press members (10C) of the fourth preferred embodiment of a tube connector according to the present invention are shown to have four insert portions (11C) to form a substantially cross-shaped figure.

Figure 4D:
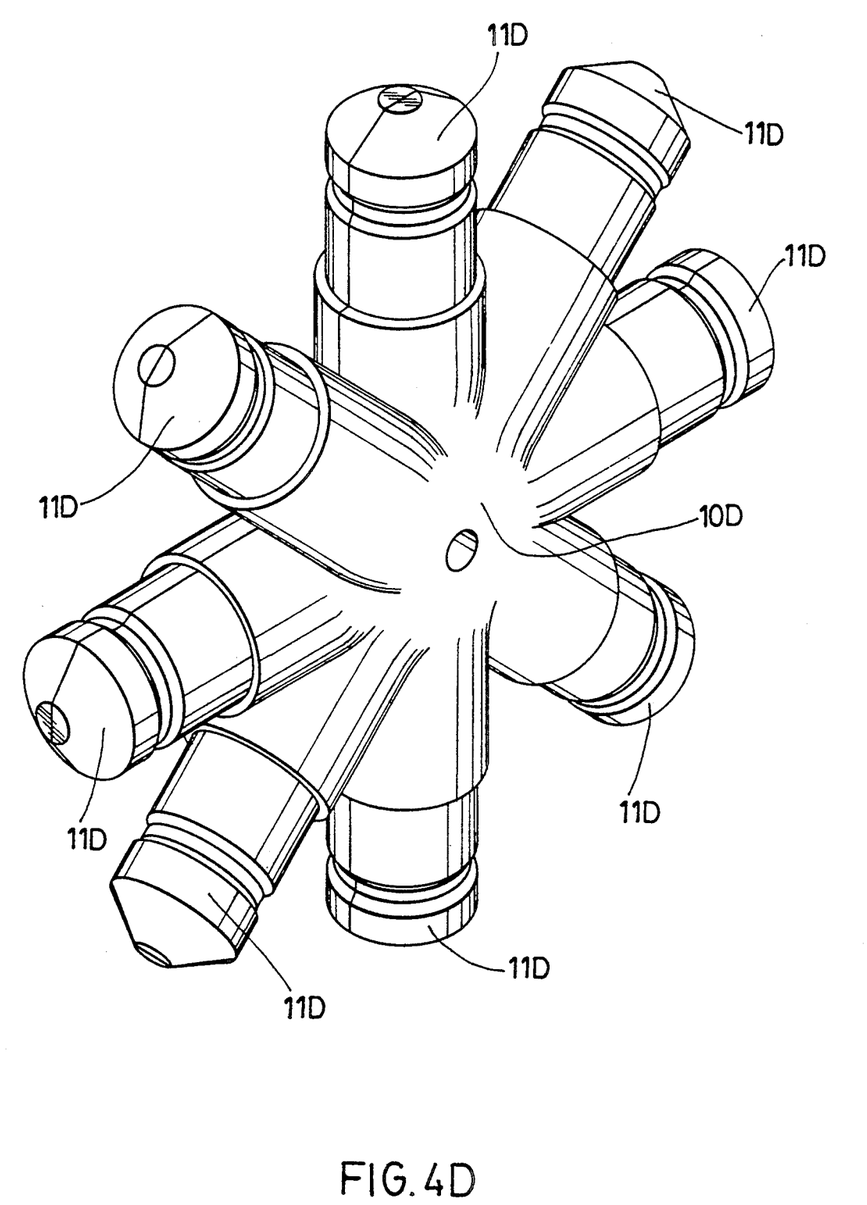
FIG. 4D is a perspective view of the fifth preferred embodiment of a tube connector according to the present invention.

Referring to FIG. 4D, the matching press members (10D) of the fifth preferred embodiment of a tube connector according to the present invention are shown to have eight radially extending and angularly spaced insert portions (11D). This permits tight joining of two or more tubes at different angles.

Figure 5:
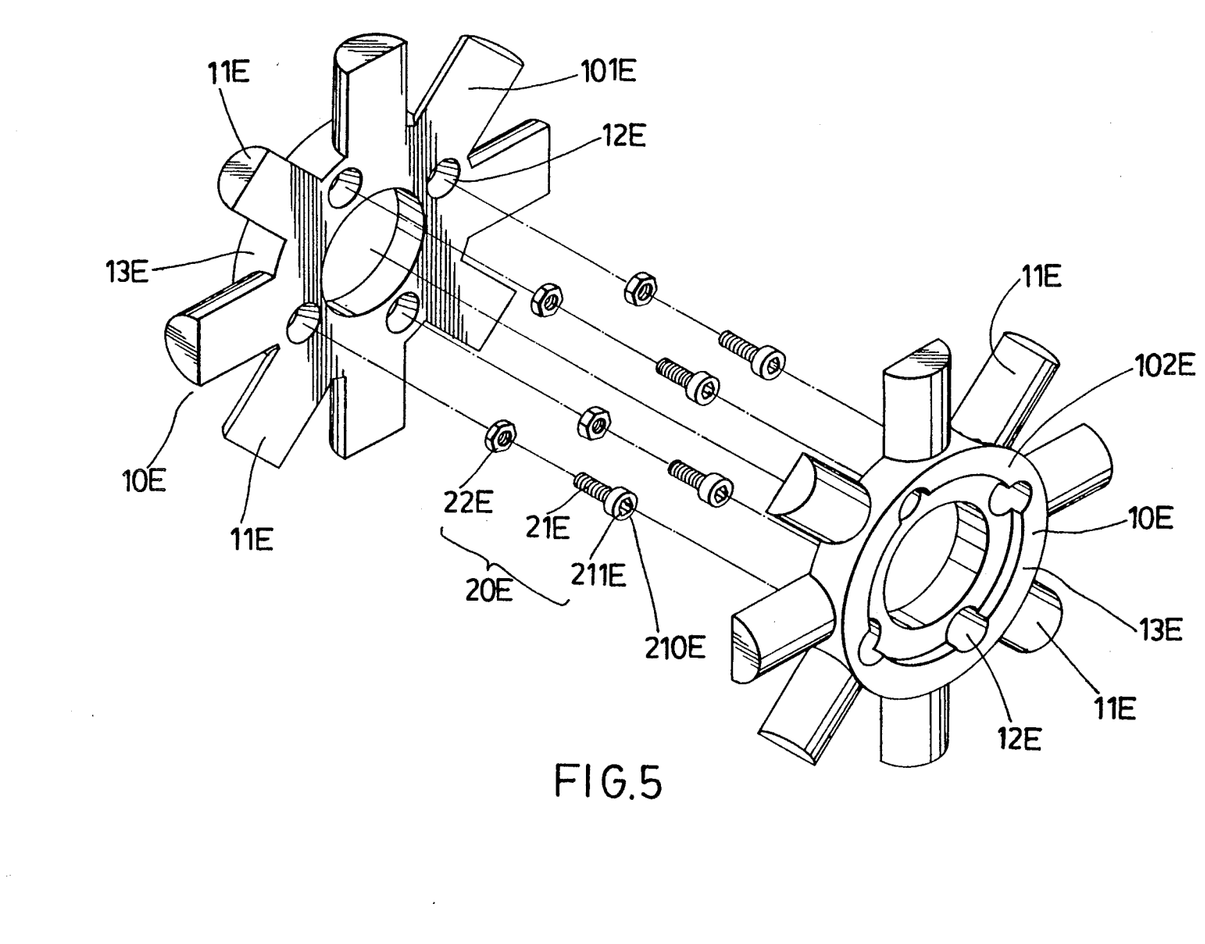
FIG. 5 is an exploded view of the sixth preferred embodiment of a tube connector according to the present invention.

The tube connector of the present invention can have a ring-shaped construction. Referring to FIG. 5, the sixth preferred embodiment of a tube connector according to the present invention is shown to comprise a pair of matching press members (10E) and four sets of expansible engaging means (11E).

Each of the press members (10E) has a flat first side (101E), a second side (102E) opposite to the flat first side (101E), an annular exposed portion (13E), and eight angularly spaced insert portions (11E) extending radially outward from the annular exposed portion (13E).

Each of the insert portions (11E) is shaped as an elongated cylindrical half. The annular exposed portion (13E) of each press member (10E) is provided with four counterbores (12E). [The counterbores (12E) are similar in construction to the counterbore 12 shown in FIG. 1 and will not be detailed further]. As with the first preferred embodiment, each of the expansible engaging means (20E) includes a threaded bolt (21E) and a nut (22E) to engage the threaded bolt (21E). The threaded bolt (21E) has a head portion (210E) provided with a hexagonal groove (211E). The outer diameters of the head portion (210E) of the threaded bolt (21E) and the nut (22E) should be within the range of the greatest and smallest diameters of the counterbore (12E). This permits positioning of the expansible engaging means (20E) inside the counterbores (12E) of the matching press members (10E).

Figure 6:
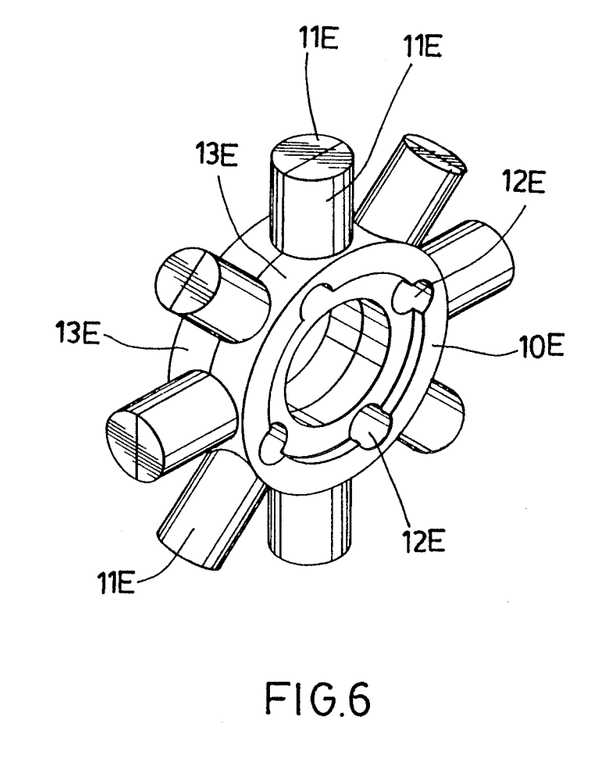
FIG. 6 is a perspective view of the assembled sixth preferred embodiment.
Figure 7A:
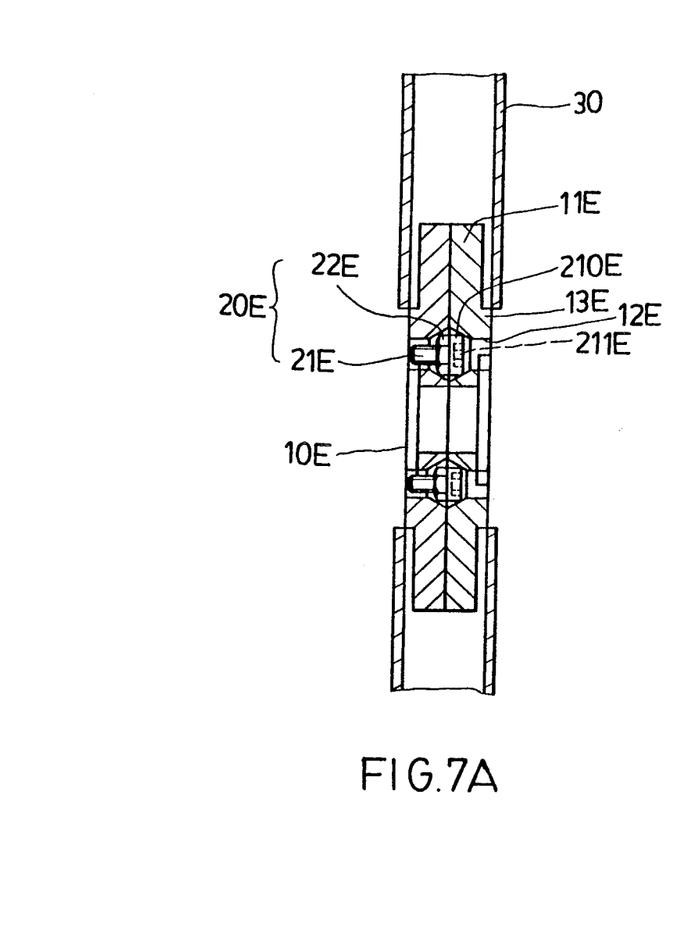
FIG. 7A is a sectional view of the sixth preferred embodiment when in a fully contracted position.
Figure 7B:
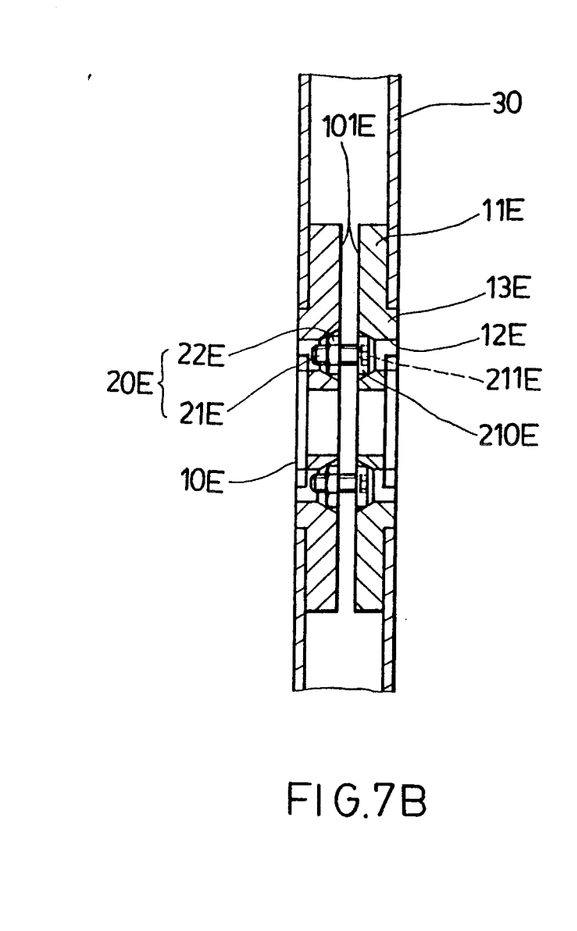
FIG. 7B is a sectional view of the sixth preferred embodiment when in a fully expanded position of use.

To use the sixth preferred embodiment, the matching press members (10E) are initially placed in a fully contracted position, as shown in FIGS. 6 and 7A. The flat first sides (101E) of the matching press members (10E) abut against one another, and the head portion (210E) of the threaded bolts (21E) and the nuts (22E) are in tight contact. The insert portions (11E) of the matching press members (10E) form eight cylindrical members, each of which is inserted into one end of a respective tube 30. The threaded bolts (21E) are rotated through the use of a wrench so as to move the nuts (22E) axially along the threaded bolt (21E) and thereby expand the matching press members (10E), as shown in FIG. 7B. The threaded bolts (21E) are rotated until the matching press members (10E) are tightly pressed against the inner surfaces of the tubes 30. The distal end of each tube 30 abuts against the annular exposed portion (13E) of the matching press members (10E). The sixth preferred embodiment permits tight joining of two or more tubes at angles of 45, 90, or 180 degrees therebetween.

Figure 8A:
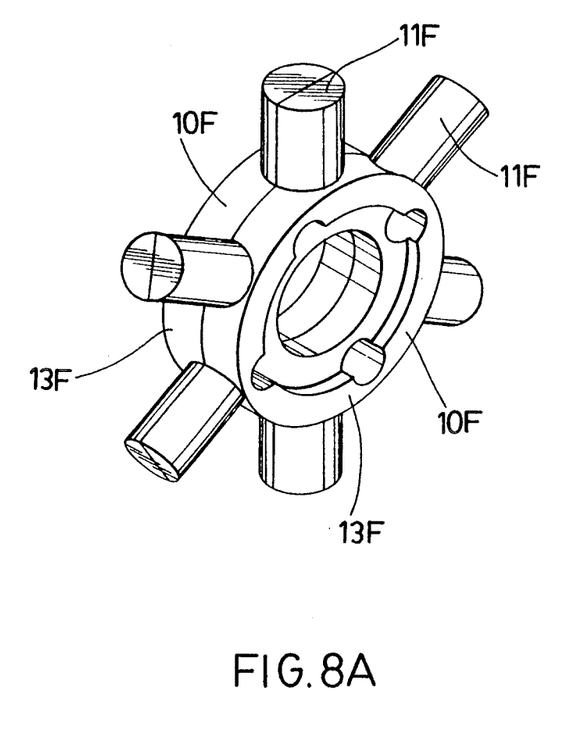
FIG. 8A is a perspective view of the seventh preferred embodiment of a tube connector according to the present invention.

Referring to FIG. 8A, the seventh preferred embodiment of a tube connector according to the present invention comprises a pair of matching press members (10F) and expansible engaging means (not shown). Each of the press members (10F) has an annular exposed portion (13F), and six angularly spaced insert portions (11F) extending radially outward from the annular exposed portion (13F). The seventh preferred embodiment permits interconnection of two to six tubes at angles of 60, 120 or 180 degrees therebetween.

Figure 8B:
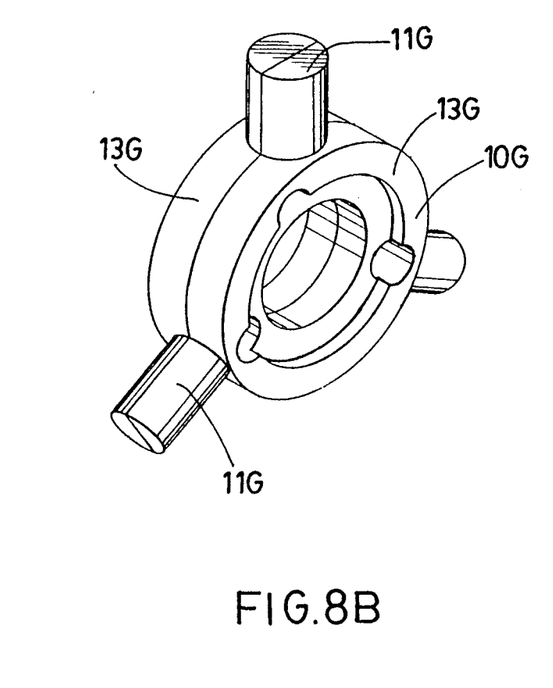
FIG. 8B is a perspective view of the eighth preferred embodiment of a tube connector according to the present invention.

Finally, referring to FIG. 8B, each of the press members (10G) of the eighth preferred embodiment of a tube connector according to the present invention has an annular exposed portion (13G), and three angularly spaced insert portions (11G) extending radially outward from the annular exposed portion (13G). The eighth preferred embodiment permits interconnection of two or three tubes at an angle of 120 degrees therebetween.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A tube connector, comprising:
   a pair of matching press members, each of said press members having a flat first side, a second side opposite said flat first side, an enlarged exposed portion and at least two angularly spaced insert portions extending from said exposed portion, said insert portions of one of said press members forming cylindrical members with said insert portions of the other one of said press members, each of said cylindrical members being inserted into one end of a respective tube such that a distal end of the respective tube abuts against said exposed portion of each of said press members, said exposed portion of each of said press members having a flat side surface at said flat first side in which a counterbore is formed, said counterbore having a truncated conical portion and a cylindrical portion; and at least one expansible engaging means, each said expansible engaging means including a bolt with a head portion and a threaded shaft portion, and a nut to engage said threaded shaft portion, each of said head portion and said nut being received in said truncated conical portion of paid counterbore in a respective one of said press members, outer diameters of said head portion and said nut being smaller than a greatest diameter of said truncated conical portion of said counterbore and being greater than a smallest diameter of said truncated conical portion of said counterbore, said bolt being rotated so as to move said nut axially along said threaded shaft portion between a first position, wherein said flat first sides of said press members abut against one another, and a second position, wherein said flat first sides are spaced apart and said press members tightly press against an inner surface of the respective tube.

2. The tube connector as claimed in claim 1, wherein each of said insert portions is shaped as an elongated cylindrical half.

3. The tube connector as claimed in claim 2, wherein said exposed portion is shaped as an elongated cylindrical half.

4. The tube connector as claimed in claim 1, wherein said head portion is provided with a hexagonal groove accessible from said cylindrical portion so as to allow rotation of said bolt by a wrench.

5. The tube connector as claimed in claim 2, wherein said exposed portion is annular in shape and said insert portions extend radially outward from said exposed portion.

* * * * *

UNITED STATES PATENT AND TRADEMARK OFFICE
CERTIFICATE OF CORRECTION

PATENT NO. : 5,083,882

DATED : January 28, 1992

INVENTOR(S) : Chu Liu

It is certified that error appears in the above-identified patent and that said Letters Patent is hereby corrected as shown below:

Column 5, line 20, delete "paid" and insert --said--.

Signed and Sealed this

Twenty-seventh Day of April, 1993

Attest:

MICHAEL K. KIRK

*Attesting Officer*      *Acting Commissioner of Patents and Trademarks*